United States Patent Office 3,242,149
Patented Mar. 22, 1966

3,242,149
PROCESS FOR PRODUCING COPOLYMERS OF ETHYLENE AND PROPYLENE HAVING REGULATED MOLECULAR WEIGHT
Ettore Giachetti and Francesco Scalari, Milan, Italy, assignors to Montecatini Società Generale per l'Industria Mineraria e Chimica, Milan, Italy
No Drawing. Filed July 26, 1960, Ser. No. 45,267
Claims priority, application Italy, July 31, 1959, 12,981/59
16 Claims. (Cl. 260—88.2)

This invention relates to a process for regulating the molecular weight of copolymerizates obtained by polymerizing a mixture of ethylene and an alpha olefin in contact with a catalyst prepared from organometallic compounds and transition metal compounds.

The Natta group has disclosed that valuable copolymers of propylene and ethylene can be produced by contacting the mixed monomers with a catalyst obtained by mixing a halogenated, hydrocarbon solvent-soluble compound of a transition metal belonging to Groups IV to VI inclusive of the Mendeleeff Periodic Table with an alkyl compound of a metal belonging to Groups II to III of said table.

In order to obtain vulcanizable amorphous copolymers which exhibit good elastomeric properties after vulcanization thereof, the copolymer must have a certain minimum molecular weight, usually a molecular weight of at least 10,000 and preferably about 20,000.

However, the copolymers obtained with the catalysts mentioned generally have very high molecular weights, which may be 500,000 or higher. The high molecular weights can complicate the conversion of the copolymers to elastomers by vulcanization and also can result in elastomers the properties of which are less satisfactory than they might be, in some respects.

It has been proposed to introduce gaseous hydrogen into the copolymerization reactor for the purpose of regulating the molecular weight of the copolymer being produced. However, the use of $H_2$ for that purpose involves the difficult problem of controlling the exact amount of the gaseous $H_2$ present during the copolymerization, which in turn makes it difficult to regulate the molecular weight of the copolymer since the extent of the regulation depends on the amount of hydrogen present during the copolymerization reaction.

One object of this invention is to provide a process for producing an ethylene-alpha olefin copolymer, particularly ethylene-propylene and ethylene-butene-1 copolymers, having a regulated molecular weight which process does not involve the use of hydrogen as molecular weight regulator or present the problems that are encountered when hydrogen is used.

Another object of the invention is to provide a process for producing an ethylene-alpha olefin copolymer, particularly ethylene-propylene and ethylene-butene-1 copolymers having a regulated molecular weight by contacting the mixed monomers, in an inert hydrocarbon solvent, with catalysts of the aforesaid type and in which process there is present, during the copolymerization, a substance which regulates the molecular weight in dependence on the amount thereof present during the copolymerization reaction, and the amount of which is readily controllable.

The molecular weight regulator according to this invention is an organometallic, specifically an alkyl, compound of a metal belonging to Groups II to III inclusive of the Mendeleeff table other than the metal present in the organometallic component mixed with the transition metal compound to form the catalyst. For example, if the catalyst is formed from the transition metal compound and an organometallic compound of aluminum, the molecular weight regulator used is an organometallic compound of a Group II to III metal other than aluminum.

Likewise, if an organometallic compound of beryllium is used in forming the catalyst proper, the regulator is an organometallic compound of a Group II to III metal other than beryllium.

The soluble organometallic compound can be formed in situ during the preparation of the catalyst. Thus, there may be included with the catalyst-forming components a compound of the Group II or Group III metal which is not per se an organometallic compound and which is insoluble in the hydrocarbon polymerization medium, provided that, under the conditions used for forming the catalyst, and by reaction with a portion of the organometallic catalyst-forming component, it is converted to an organometallic compound which is soluble in the hydrocarbon solvent.

Particularly suitable organometallic compounds for use as the molecular weight regulator are the zinc alkyls in which the alkyl groups contain from 1 to 5 carbon atoms. Zinc halides, such as zinc chloride or zinc bromide, which are converted quantitatively to soluble organometallic compounds of zinc by reaction with the organometallic catalyst-forming component during the preparation of the catalyst can also be used.

Illustratively, if the catalyst forming components are a transition metal chloride such as $VCl_4$, and tri-isobutyl aluminum, zinc chloride can be used as starting material for the molecular weight regulator and is converted, by reaction with the tri-isobutyl aluminum in the hydrocarbon solvent, to di-isobutyl zinc which is soluble in the hydrocarbon solvent.

The ratio between the molecular weight regulator and the monomers can be varied within wide limits depending on the particular regulator used and on the molecular weight desired for the copolymerizate.

In general, the molar ratio between the regulator and the monomers mixture is comprised between $0.1 \times 10^{-5}$ and $50 \times 10^{-5}$, preferably between $4 \times 10^{-5}$ and $12 \times 10^{-5}$.

We have discovered that by the practice of this invention, copolymerizates having molecular weights considerably below the normal, that is, as compared to the molecular weight of the copolymerizates obtained with the stated catalysts in the absence of the molecular weight regulator, can be obtained without operating difficulties. Moreover, the regulation of the molecular weight in accordance with the present method is accomplished without a reduction in the yield of copolymer obtained per gram of catalyst used. In some instances, the yield of copolymer is increased.

Infra-red examination of the copolymers obtained using progressively increasing amounts of molecular weight regulator did not reveal variations in the percent by mols of the alpha olefin in the copolymer molecule (which was generally about 50% but may be from 30% to 70%) as compared to the percent by mols of alpha olefin contained in copolymers produced under otherwise similar conditions but in the absence of the molecular weight regulator.

As Natta et al., have shown, in application Ser. No. 629,085, the copolymerization of ethylene and alpha olefins can lead to the production of copolymerizates consisting essentially of linear, substantially amorphous copolymers free of homopolymers. Such copolymerizates similarly free or substantially free of homopolymers are obtained, also, when the directive copolymerization as disclosed by Natta et al. is carried out in the presence of a molecular weight regulator in accordance with this invention.

The following examples are given to illustrate the invention, it being understood that these examples are not intended to be limiting.

*Example 1*

The polymerization is carried out in a 7.5 liter autoclave, provided with a mechanical agitator and an outer cooling jacket.

6.5 liters of liquid propylene are introduced and saturated with ethylene at $-10°$ C. up to a pressure of 5 absolute atm., so as to reach the propylene-ethylene molar composition in the liquid phase of 97/3 required for the production of a copolymer containing 50% propylene by mols.

A hydrocarbon solution of vanadium tetrachloride is then introduced in small portions, together with the mixture of the organometallic derivatives of aluminum and zinc.

In this series of polymerization runs the catalyst is formed by mixing 0.13 g. $VCl_4$ with 0.52 g. $Al(i=C_4H_9)_3$, and the molecular weight regulator is diethyl zinc.

The amount of diethyl zinc used in each run is reported in Table I.

TABLE I

| $Zn(C_2H_5)_2$ g. | Intrinsic Viscosity [$\eta$] | Yield g. polymer/g. $VCl_4$ |
|---|---|---|
| ---------- | 10.8 | 3.6 |
| 0.25 | 7.1 | 3.5 |
| 0.50 | 4.2 | 3.5 |
| 1.00 | 3.4 | 3.35 |
| 1.50 | 2.1 | 3.25 |
| 2.50 | 1.2 | 2.9 |

The intrinsic viscosity was determined at 135° C. in tetrahydronaphthalene.

*Example 2*

Example 1 is repeated, except that the catalyst is prepared from 0.13 g. $VCl_4$ and 0.51 g. $Al(i=C_4H_9)_3$, and the molecular weight regulator is formed from 1.3 g. $ZnCl_2$ which is converted to di-isobutyl zinc dissolved in the hydrocarbon solvent by reaction with 3.77 g. $Al(i=C_4H_9)_3$.

After a polymerization time of about 40 minutes, 460 g. of copolymer (corresponding to a yield of 3500 g. copolymer/g. $VCl_4$) are obtained. The copolymer has an intrinsic viscosity [$\eta$] of 4.75, determined in tetrahydronaphthalene at 135° C.

*Example 3*

The polymerization is carried out in a 7.5 liter autoclave, provided with a mechanical agitator and an outer cooling jacket. 6.5 liters of liquid propylene are introduced and saturated with ethylene at $-10°$ C. up to a pressure of 5 absolute atm. so as to reach the propylene-ethylene molar composition of 97/3, in the liquid phase, required for obtaining a copolymer containing 50% propylene by mols. A hydrocarbon solution of vanadium tetrachloride, of tri-isobutyl aluminum, and of diethyl cadmium is then introduced in small portions.

The pressure is kept constant during the run by continuous introduction of ethylene. After polymerization for 40 minutes the copolymer is discharged.

The catalyst in these runs is formed from 0.19 g. $VCl_4$ and 0.78 g. $Al(i=C_4H_9)_3$.

The amount of $Cd(C_2H_5)_2$ used is reported in Table II.

TABLE II

| $Cd(C_2H_5)_2$ g. | Intrinsic viscosity [$\eta$] | Yield, g. polymer/g. $VCl_4$ |
|---|---|---|
| ---------- | 8.70 | 2.5 |
| 0.22 | 7.50 | 2.3 |
| 1.32 | 3.50 | 1.1 |

The intrinsic viscosity was determined in tetrahydronaphthalene at 135° C.

*Example 4*

The polymerization is carried out in the same apparatus as that of Example 1.

6.5 liters of liquid butene-1 are introduced and saturated with ethylene at $-10°$ C. up to a pressure of 2.03 absolute atm.

Under such conditions the butene-1/ethylene molar composition in the liquid phase is 95/5.

The catalyst is prepared directly in the autoclave by simultaneous introduction of small portions of the single components of the catalysts, and of the molecular weight regulator diluted in heptane, in the following amounts: 0.30 g. $VCl_4$, 1.04 g. $Al(i=C_4H_9)_3$, 1.5 g. $Zn(C_2H_5)_2$.

The pressure is kept constant during the run by the continuous introduction of ethylene.

After about 1 hour, 320 g. of a copolymer having an intrinsic viscosity of 2.25 determined in tetrahydronaphthalene at 135° C. are obtained. The infra-red examination of the polymer showed a butene-1 content of 35% by mols.

A similar run, carried out with the same modalities but in absence of $Zn(C_2H_5)_2$, gave 355 g. of copolymer having an intrinsic viscosity of [$\eta$] of 6.0, determined as above.

*Example 5*

A copolymer of ethylene and propylene produced in accordance with this invention, using diethyl zinc as the molecular weight regulator, which contained 50 mol percent of propylene in the molecule, and had an intrinsic viscosity of 3.0 in tetrahydronaphthalene at 135° C., was vulcanized by mixing 100 parts of the copolymer with the following materials:

Parts by weight
Carbon black HAF _____ 50
Sulfur _____ 0.3
Tert. butyl cumyl peroxide _____ 2.0 and the mix was vulcanized by heating it at 165° C. for 40 minutes. The vulcanized product had the following characteristics:

Tensile strength, kg./cm.$^2$ _____ 209
Elongation at break, percent _____ 575
Modulus at 300%, kg./cm.$^2$ _____ 75
Residual elongation at 200%, percent _____ 10

*Example 6*

The following ingredients were mixed with 100 parts of the ethylene-butene-1 copolymer of Example 4:

Parts by weight
Carbon black HAF _____ 50
Sulfur _____ 0.3
Cumyl peroxide _____ 2.6 and the mix was vulcanized by heating it at 165° C. for 30 minutes. The vulcanized product had the following characteristics:

Tensile strength, kg./cm.$^2$ _____ 220
Elongation at break, percent _____ 380
Modulus at 300% _____ 156
Residual elongation at 200%, percent _____ 12

The foregoing examples demonstrate the effectiveness of hydrocarbon solvent-soluble zinc and cadmium alkyls in regulating the molecular weight of the copolymers. Alkyl derivatives of other metals belonging to Groups II and III in which the alkyl radicals contain from 1 to 5 carbon atoms and the metal is different from the metal in the organometallic component of the catalyst proper can be used. Likewise, compounds of such metals other than the halides, and which react in the hydrocarbon solvent with the organometallic compound used as one component of the catalyst to form soluble organometallic compounds, can be used. In the latter case the amount of organometallic catalyst-forming component used is calculated to provide a sufficient amount thereof to combine with the transition metal compound and also react with the precursor of the molecular weight regulator, such as zinc chloride, to form the organometallic zinc compound which acts to regulate the molecular weight of the copolymerizate produced.

By carrying out the directive polymerization of mixtures of ethylene and an alpha-olefin such as mixtures of ethylene and propylene or butene-1 according to Natta et al., to produce copolymerizates consisting essentially of linear, substantially amorphous copolymers free of homopolymers and which are vulcanizable, in the presence of the molecular weight regulator according to this invention, we obtain the copolymerizates having a regulated molecular weight, which preferably are between 10,000 and 300,000, and is lower than the molecular weight of the copolymerizates obtained in the absence of the regulator. The copolymerizates having the lower, regulated molecular weight can be vulcanized to valuable elastomers using organic peroxides, or mixtures of the peroxides and sulfur or a quinonic compound, as the vulcanizing aids.

Since some variations in details, such as in the selection of specific catalyst-forming components, and in the selection of the molecular weight regulator, can be made in practicing the invention without departing from the spirit thereof, we intend to include in the scope of the appended claims all such modifications as may be apparent to those skilled in the art from the description and examples given herein.

What is claimed is:

1. In a process for the copolymerization of ethylene and a higher alpha-olefin to amorphous copolymers, wherein a mixture of the monomers is contacted, in a hydrocarbon solvent, with at least a catalytic amount of a catalyst formed by mixing vanadium tetrachloride with tri-isobutyl aluminum, the step of carrying out the copolymerization in the presence of a hydrocarbon solvent-soluble organometallic compound of a metal selected from the group consisting of zinc and cadmium which is dissolved in the hydrocarbon solvent in an amount sufficient to regulate the molecular weight of the copolymerizate produced and wherein the molar ratio of the hydrocarbon solvent-soluble organometallic compound of a metal selected from the group consisting of zinc and cadmium to tri-isobutyl aluminum is from about 0.33 to about 7.7.

2. The process according to claim 1, characterized in that the molar ratio of the molecular weight regulator to the mixed monomers is comprised from between $0.1 \times 10^{-5}$ and $50 \times 10^{-5}$.

3. The process according to claim 1, characterized in that the molar ratio of the molecular weight regulator to the mixed monomers is comprised between $4 \times 10^{-5}$ and $12 \times 10^{-5}$.

4. The process according to claim 1, characterized in that the monomers copolymerized are ethylene and propylene.

5. The process according to claim 1, characterized in that the monomers copolymerized are ethylene and butene-1.

6. The process according to claim 1, characterized in that the molar ratio of ethylene to higher alpha-olefins in the mixture copolymerized is such that the copolymer produced contains from 30 mol percent up to 70 mol percent of the higher alpha-olefin in the molecule.

7. The process according to claim 1, characterized in that the molar ratio of ethylene to higher alpha-olefin in the mixture copolymerized is such that the copolymer produced contains about 50% of the higher alpha-olefin in the molecule.

8. The process according to claim 1, characterized in that the catalyst is formed by mixing vanadium tetrachloride with tri-isobutyl aluminum, and the molecular weight regulator is a zinc dialkyl.

9. The process according to claim 1, characterized in that the catalyst is formed by mixing vanadium tetrachloride with tri-isobutyl aluminum and the molecular weight regulator is diethyl zinc.

10. The process according to claim 1, characterized in that the molecular weight regulator is formed during the preparation of the catalyst from the hydrocarbon solvent-insoluble non-organometallic derivative of said metal selected from the group consisting of zinc and cadmium which derivative is converted to a hydrocarbon solvent-soluble organometallic compound of said metal by reaction with tri-isobutyl aluminum, in the hydrocarbon solvent.

11. The process according to claim 1, characterized in that the catalyst is formed by mixing vanadium tetrachloride with tri-isobutyl aluminum, and the molecular weight regulator is formed by the conversion of a zinc halide to a hydrocarbon-soluble zinc dialkyl by reaction of the zinc halide with tri-isobutyl aluminum, in the hydrocarbon solvent.

12. The process according to claim 1, characterized in that the catalyst is formed by mixing vanadium tetrachloride with tri-isobutyl aluminum, and the molecular weight regulator is di-isobutyl zinc formed by the reaction of zinc chloride with tri-isobutyl aluminum, in the hydrocarbon solvent.

13. The process according to claim 1, characterized in that the monomers copolymerized are ethylene and propylene and the molar ratio thereof in the monomers mixture is such that the copolymer produced contains from 30 mol percent to 70 mol percent of propylene in the molecule.

14. The process according to claim 1, characterized in that the monomers copolymerized are ethylene and propylene and the molar ratio thereof in the monomers mixture is such that the copolymer produced contains about 50 mol percent of propylene in the molecule.

15. The process according to claim 1, characterized in that the catalyst is formed by mixing vanadium tetrachloride with tri-isobutyl aluminum, and the molecular weight regulator is a cadmium dialkyl.

16. The process according to claim 1, characterized in that the catalyst is formed by mixing vanadium tetrachloride with tri-isobutyl aluminum, and the molecular weight regulator is cadmium diethyl.

References Cited by the Examiner
FOREIGN PATENTS 538,782 12/1955 Belgium.
553,655 6/1957 Belgium.
572,726 5/1959 Belgium.

JOSEPH L. SCHOFER, *Primary Examiner.*

LESLIE H. GASTON, *Examiner.*